L. JAENICHEN.
SCALE.
APPLICATION FILED JULY 14, 1915.
1,228,927.
Patented June 5, 1917.
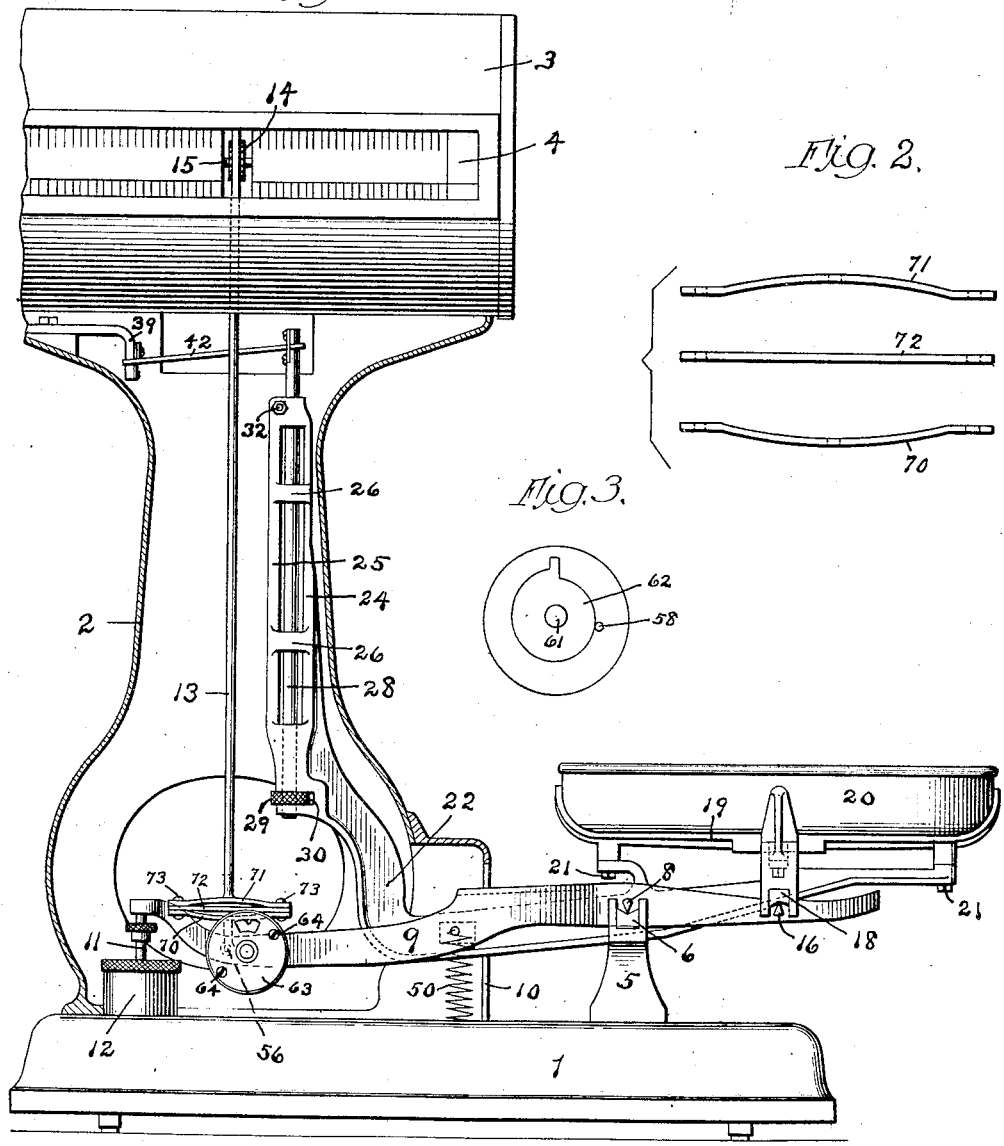
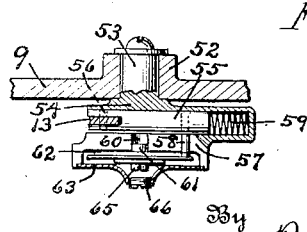
Inventor
Louis Jaenichen.
By Pagelsen and Spencer
Attorneys.
Witness
R. Barrett

UNITED STATES PATENT OFFICE.

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

SCALE.

1,228,927.        Specification of Letters Patent.        Patented June 5, 1917.

Application filed July 14, 1915. Serial No. 39,748.

*To all whom it may concern:*

Be it known that I, LOUIS JAENICHEN, a citizen of the United States, residing at Detroit, in the county of Wayne and State of Michigan, have invented a new and useful Scale, of which the following is a specification.

This invention relates to the class of barrel or drum scales, and its object is to provide means whereby the drum upon which the values of the articles to be weighed are printed will be caused to stand at zero at all times when the scale is unloaded during all changes of temperature.

This invention consists in combination with the usual load supporting lever of the scale, of an indicating mechanism of any desired type, a connection between the lever and the indicating mechanism in the form of a two-part rod, a spring connected to the lever to resist the load, and a thermostat so mounted between the two parts of the rod that extends between the lever and the indicating mechanism that the initial expansion and contraction of the spring because of the changes in temperature will be compensated for and all movement of the indicating mechanism by reason of such changes in the spring by reason of changes in temperature will be prevented.

In the accompanying drawings, Figure 1 is in part side elevation and in part central vertical section of one embodiment of my invention. Fig. 2 is a detail on a large scale of the thermostat. Fig. 3 is a snail cam for adjusting the operative length of one of the arms of the weighing lever. Fig. 4 is a horizontal section of the adjusting cam for the lower end of the indicating actuating rod.

Similar reference characters refer to like parts throughout the several views.

The mechanism shown in the drawings is that shown in Fig. 1 of my former application, filed April 16th, 1915, Serial Number 21,629, and many of the same characters are used to indicate the same parts of the scale. In these drawings as well as in those of my former application, 1 indicates the base, 2 the housing and 3 the drum housing within which the drum 4 bearing value figures is mounted to rotate about a horizontal axis. Rising from the base is a pedestal 5 on which are supported the bearings 6 for the knife edges 8 that project from the main scale beam or lever 9. One end of the beam extends through a slot 10 in the housing 2 and is connected in any desired manner to the piston rod 11 of a dash-pot 12 and to a rod or bar 13, the upper end of which is in the form of a rack to engage with a pinion 14 on the shaft 15 of the drum 4. This lever 9 carries knife edges 16 on which rest the bearing blocks 18 of a spider 19, the arms of which inclose and position the scale pan 20. The spider is rigidly secured, preferably by bolts 21, to a check lever 22 that extends through a slot 10 up into the housing 2. This upper arm may consist of the longitudinal portions 24 and 25 joined at intervals by cross lugs 26. These lugs are perforated to receive a check-bar adjusting and supporting rod 28 that may be threaded at its lower end to pass through a thumb-nut 29 located in a slot 30 in the check lever. Upon turning the nut the rod is adjusted vertically. The upper end of the check lever is preferably split and gripped around the vertical rod 28 by means of a bolt 32.

The upper end of the rod 28 may be connected to the bracket 39 by means of a small check bar 42. The details of this connection and of the check lever form the subject matter of the prior application above referred to and need not be further described. Any other desired mechanism may be substituted for that thus far described.

Extending down from the lever 9 is a spring 50 which resists the upward movement of the inner arm of this beam or lever 9 under the pressure of the load on the scale pan. This upward movement is communicated to the rack-bar 13 by means of the following mechanism. Adjustably but rigidly mounted in a hub 52 on the beam 9 is a trunnion 53 on a guide plate 54 which carries a longitudinally slidable piston 55. The lower end of the rack-bar 13 is connected to this piston by means of a small pivot 56, shown in dotted lines in Figs. 1 and 4. The guide plate 54 is formed with a slot 57 in which a guide pin 58, carried by the piston 55, is slidable. A spring 59 normally tends to move these various parts to the left in Figs. 1 and 4. In a small bore 60 in the guide plate is mounted a trunnion 61, which carries a snail cam 62 which is prevented from moving out of place by means of the cover plate 63 held in position by means of screws 64, shown in Fig. 1. This trunnion 61 fits sufficiently tightly in the bore 60 to keep it from turning unless forcibly turned by means of a tool inserted in a central opening in the face of the cover 63 and into engagement with the projection 65, the opening being usually closed by means of a screw plug 66. This snail cam is normally engaged by means of the pin 58 on the piston 55. It will therefore be seen that by turning the snail cam, the relative position of the piston 55 and of the pivot 56 of the rod 13 with respect to the lever 9 may be changed, that is, the pivot 56 may be moved in and out in order to accurately determine the operative length of the lever arm which actuates this vertical rack bar 13.

The spring 50 usually expands and contracts at a different and greater rate with changes of temperature than the other mechanism, and as a result, the rack-bar 13 usually moves up as the temperature increases, thereby turning the drum 4 so that its zero line is not in correct position when the beam is unloaded, but indicates a slight amount of load. To overcome this difficulty, this rack-bar is formed of two parts, preferably in alinement with each other, the lower portion being connected to the cross bar 70, the upper part to the cross bar 71 and these two cross bars being connected at their ends to the third cross bar 72 by means of rivets 73.

By forming the bars 70 and 71 of a metal having a lower coefficient of expansion than the bar 72, the two parts of the rack-bar will approach with rising temperature and thus shorten the rack-bar and separate with falling temperature and thus lengthen the rack-bar. This effect is obtained by making the outside bars 70 and 71 of steel and the inside bar 72 of brass. The details of this thermostat may be changed without departing from the spirit of my invention.

I claim:—

1. In a weighing scale, the combination of a base, a beam pivotally supported thereon, a load-resisting spring connected to the beam, a weight indicating mechanism, a rod for actuating the weight indicating mechanism, a member slidably mounted on said beam and pivotally connected to said rod, a cam for positioning the slidable member, and a spring to hold the slidable member in engagement with the cam.

2. In a weighing scale, the combination of a base, a beam pivotally supported thereon, a weight indicating mechanism, a two part rod connected to the indicator, a thermostat connecting the two parts of the rod, a pivot slidable on the beam and engaged by the adjacent end of the rod, and a cam mounted on the beam to position said pivot.

3. In a weighing scale, the combination of a base, a beam fulcrumed thereon, a pivot carrier slidably and revolubly mounted on one end of said beam, a pivot mounted on the pivot carrier, a cam to position said pivot, an indicator actuating rod mounted on said pivot and formed of two parts, a thermostat connecting said parts, and a weight indicator actuated by said rod.

In testimony whereof I sign this specification.

LOUIS JAENICHEN